United States Patent [19]

Soedervall

[11] Patent Number: 4,781,747
[45] Date of Patent: Nov. 1, 1988

[54] BLOW BACK CONTROL DEVICE IN GLASS TEMPERING SYSTEM

[75] Inventor: Sven E. F. Soedervall, Edane, Sweden

[73] Assignee: Glasstech International L.P., Scarsdale, N.Y.

[21] Appl. No.: 86,971

[22] Filed: Aug. 17, 1987

[51] Int. Cl.$^4$ .............................................. C03B 27/04
[52] U.S. Cl. ........................................ 65/348; 65/114
[58] Field of Search ................ 65/114, 115, 348, 349, 65/351, 104, 110

[56] References Cited

U.S. PATENT DOCUMENTS

| | | | |
|---|---|---|---|
| 3,393,062 | 7/1968 | Hesten et al. | 65/115 |
| 3,455,671 | 7/1969 | McMaster | 65/348 X |
| 3,554,723 | 1/1971 | Wilson | 65/348 X |
| 3,806,331 | 4/1974 | Bezombes | 65/348 X |
| 4,534,780 | 8/1985 | Cemin | 65/351 X |
| 4,681,616 | 7/1987 | McMaster | 65/114 |

Primary Examiner—Robert L. Lindsay
Attorney, Agent, or Firm—Brooks & Kushman

[57] ABSTRACT

In a glass tempering system (11) a blow back control device (10) disclosed includes a housing (24) having a pair of housing portions (34) defining a pair of suction chambers (26) mounted above an exit opening (20) of a glass heating furnace (12). Housing (24) has a slot (32) including slot portions (36) extending along and opening into suction chambers (26). Blowers (30) are connected to each suction chamber (26) for drawing spent cooling gas into suction chambers (26) through slot portions (36) and for discharging the gas away from exit opening (20) of furnace (12) to avoid temperature swings in the furnace caused by cooling gas entering the furnace.

16 Claims, 2 Drawing Sheets

BLOW BACK CONTROL DEVICE IN GLASS TEMPERING SYSTEM

TECHNICAL FIELD

This invention relates to a blow back control device which has particular utility for use in a glass sheet tempering system in connection with the tempering of heated glass sheets.

BACKGROUND ART

A sheet of glass can be tempered to both increase its mechanical strength and improve its breakage characteristics. When tempered glass is broken, it collapses into a large number of relatively small, dull pieces instead of shattering into sharp pieces as in the case of annealed glass.

In a glass tempering system having a roller conveyor, the glass tempering process generally involves two steps. First, a sheet of glass is heated in a glass heating furnace to its deformation point of about 1200° F. to 1300° F. Secondly, the heated glass sheet is removed from the furnace and rapidly quenched by the application of cooling gas directed onto the hot glass sheet. Rapid cooling sets up high compressive forces near the surfaces of the glass sheet which give it desired strength and breakage characteristics.

The quenching operation takes place on the roller conveyor almost immediately after the glass has left the glass heating furnace. A thin glass sheet requires a more rapid application of cooling gas after exiting the furnace than does a thicker glass sheet. The close proximity of the furnace and quenching station combined with the heating step being followed directly by the quenching step can result in cooling gases which flow off the glass sheet during the quenching step entering the furnace.

Cooling gas which enters the furnace is at a significantly lower temperature than the normal operating temperature within the furnace. As a consequence, the furnace may undergo undesirable temperature swings. Also, cooling gas may prematurely cool the glass sheet in the furnace before reaching the quenching station. Premature cooling of the glass can adversely affect its tempered characteristics or shape and is especially a problem with relatively thin glass which requires more quench gases to temper properly than does thicker glass.

DISCLOSURE OF INVENTION

An object of the present invention is to provide a blow back control device in a glass sheet tempering system that prevents cooling gas which is applied to quench a heated glass sheet, at a quenching station, from entering an associated glass heating furnace adjacent the quenching station.

In carrying out the above object, the blow back control device is used in a glass tempering system having a roller conveyor including rolls for receiving the sheet of glass that has been heated in its glass heating furnace. The furnace includes an exit end including an exit opening through which the heated glass sheet is discharged from the furnace along the rolls. The glass tempering system also has the quenching station located adjacent the exit end for rapidly applying cooling gas to the heated glass sheet. The blow back control device comprises a housing defining a suction chamber located near the exit opening of the furnace. A suction means is connected to the housing for drawing spent cooling gas through the suction chamber and for discharging the gas away from the exit opening of the furnace to avoid temperature swings in the furnace caused by cooling gas entering the furnace.

In the preferred embodiment of the invention, the suction means comprises a blower and most preferably the blower comprises a centrifugal blower.

The housing has a slot that opens into the suction chamber and through which the cooling gas is drawn. The housing is positioned above the exit opening of the furnace over the conveyor roll at the quench station nearest the exit end of the furnace. Along the suction chamber the slot extends in a direction perpendicular to the glass sheet movement on the roller conveyor.

Preferably, the housing has housing portions defining a plurality of the suction chambers and slot portions, in which each suction chamber includes a suction means. Most preferably the housing has a pair of housing portions defining a pair of suction chambers. This pair of housing portions is mounted adjacent each other with the respective suction means opposed to each other. Each slot portion therein extends from the center of the roller conveyor over one-half of the conveyor roll at the quench station nearest the exit end of the furnace so that the two slot portions extend at least the full length of the exit opening.

The blow back control device includes a support on the housing for mounting the housing in the glass tempering system. Preferably, the support includes an adjuster for adjusting the vertical positioning of the suction chamber housing above the conveyor rolls. The adjuster includes a manually operated actuator for raising and lowering the suction chamber housing wherein the manually operated actuator comprises a handle operated screw jack. The support also includes an indicator for indicating the elevation of the suction chamber housing.

The objects, features, and advantages of the present invention are readily apparent from the following detailed description of the best mode for carrying out the invention when taken in connection with the accompanying drawings.

BEST MODE FOR CARRYING OUT THE INVENTION

Figure 1:
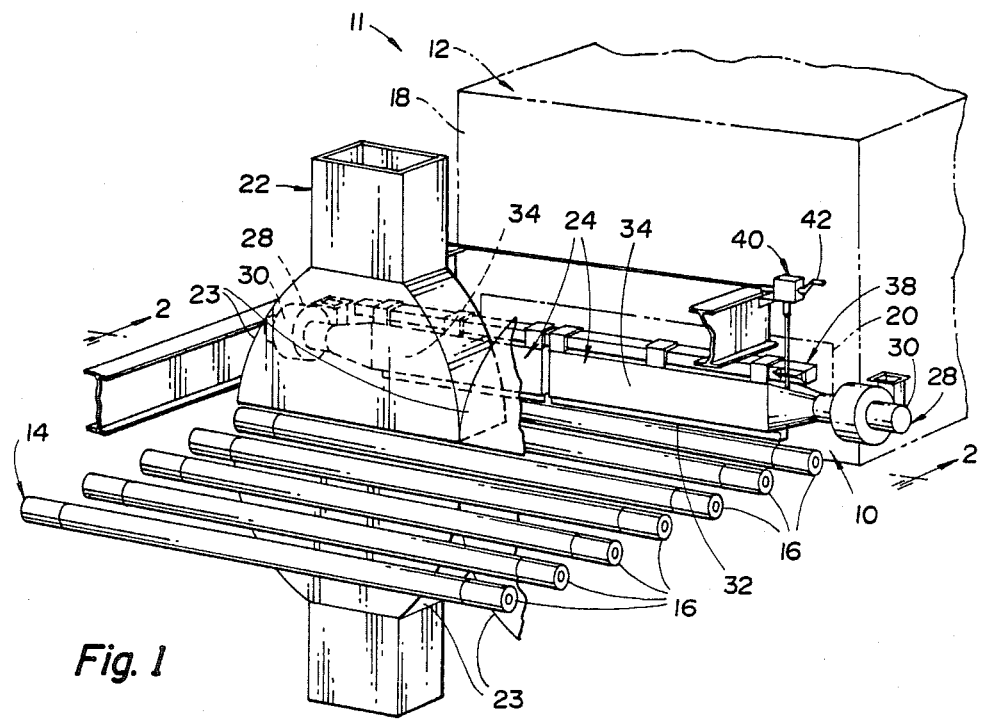
FIG. 1 is a perspective view of a glass sheet tempering system having a blow back control device constructed in accordance with the present invention and shown mounted at an exit end of a glass heating furnace and positioned over a roller conveyor.

Referring to FIG. 1 of the drawings, a blow back control device constructed in accordance with the present invention is generally indicated by reference numeral 10 and is used in a glass tempering system 11. The tempering performed in tempering system 11 includes tempering and heat strengthening where stresses are much less than conventional tempering. As is hereinafter more fully desccribed, the blow back control device 10 prevents cooling gas used for quenching heated glass sheets from traveling into a glass heating furnace 12 shown in phantom. The blow back control device 10 thereby prevents temperature swings in the furnace 12 and premature cooling of glass still in the furnace.

As shown in FIG. 1, the glass tempering system 11 has a roller conveyor 14 including rolls 16 for receiving a sheet of glass that has been heated in the glass heating furnace 12. The furnace 12 includes an exit end 18 having an exit opening 20 through which the heated glass sheet is discharged from the furnace along rolls 16. The glass tempering 11 system also has a quenching station 22 having upper and lower blastheads 23 for rapidly applying cooling gas to the heated glass sheet to thereby temper the glass sheet to increase its mechanical strength and improve its breakage characteristics.

With further reference to FIG. 1, the blow back control device 10 comprises a housing 24 of a generally elongated rectangular shape defining a suction chamber 26 located near the exit opening 20 of the furnace 12. Suction means 28 are connected by any suitable means to the housing 24 for drawing spent cooling gas through the suction chamber 26 and for discharging the gas away from the exit opening 20.

Figure 2:
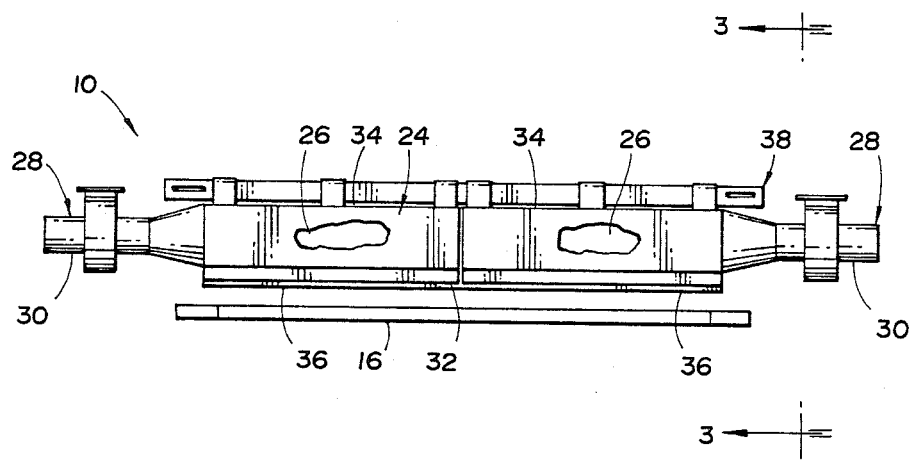
FIG. 2 is a partially broken away elevational view of the blow back control device and illustrates its housing which has housing portions defining a pair of suction chambers.

As shown in FIGS. 1 and 2, suction means 28 comprises a blower 30 for drawing cooling gas, traveling along the quenched glass sheet toward the exit opening 20 of the furnace 12, into the suction chamber 26. Suction means 28 also discharges the cooling gas away from the exit opening 20 through ductwork not shown. Cooling gas at a lower temperature than the furnace 12 temperature is thereby kept out of the furnace avoiding temperature swings in furnace and also avoiding premature cooling of glass sheets still inside the furnace. Preferably, blower 30 is a centrifugal blower although other types of blowers may be utilized.

Figure 3:
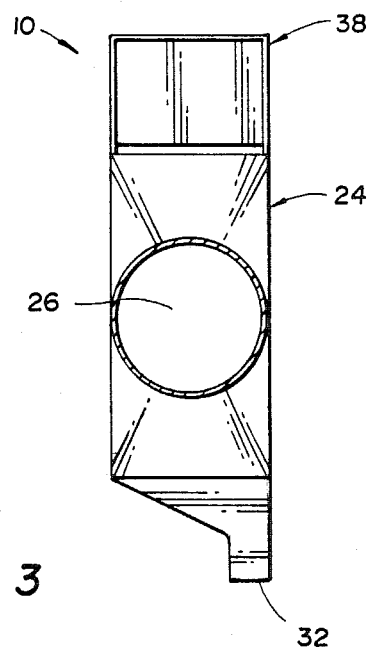
FIG. 3 is a partial sectional view taken along lines 3—3 in FIG. 2 illustrating the shape of the housing that defines the suction chambers.

As shown in FIG. 2, housing 24 has a slot 32 that opens into suction chamber 26 and through which the cooling gas is drawn. The structure of slot 32 opening into suction chamber 26 and the rectangular shape of housing 24 is best seen in FIG. 3. With further reference to FIG. 1, blow back control device 10 is positioned above exit opening 20 along furnace 12. Slot 32 extends along suction chamber 26 in a direction perpendicular to the glass sheet movement on the roller conveyor 14, best seen in FIG. 1. This positioning of the slot 32 enables most cooling gases traveling toward the exit opening 20 to be drawn into the suction chamber 26. Preferably, slot 32 in housing 24 is positioned over the conveyor roll 16 at the quenching station 22 nearest the exit end 18 of furnace 12 to provide the most efficient arrangement for controlling cooling gas blow back.

Housing 24 of blow back control device 10 shown in FIGS. 1 and 2 includes a pair of housing portions 34 defining a pair of suction chambers 26 and slot portions 36. Each suction chamber 26 includes a blower 30 for drawing in and subsequently discharging spent cooling gas. The two suction chambers 20 are mounted adjacent to each other with respective blowers 30 opposed to each other. The housing 24 may contain baffle or diffuser plates to make flow through slots 32 as uniform as required.

Suction chambers 26 are positioned with each slot portion 36 extending from the center of the roller conveyor 14 at the quenching station 22 conveyor roll 16 nearest the exit end 18 of the furnace 12. In this arrangement, the two slot portions 36 extend the full length of the exit opening 20. Use of a pair of housing portions 34 defining suction chambers 26 improves the flow of cooling gas being drawn through the blow back control device 10 as each slot portion 36 is half as long as the slot 32 length and the flow of cooling gas is shared by each suction chamber 26.

In FIG. 2, the blow back control device 10 is shown including a support 38 on the housing 24 for mounting the housing portions 26 in the glass tempering system 11. Support 38 includes an adjuster 40 for adjusting the vertical positioning of the housing 24 above the roller conveyor 14, best seen in FIG. 4. By raising and lowering housing 24, slot 32 is raised and lowered to accommodate blow back associated with quenching different thicknesses of flat glass sheets.

Figure 4:
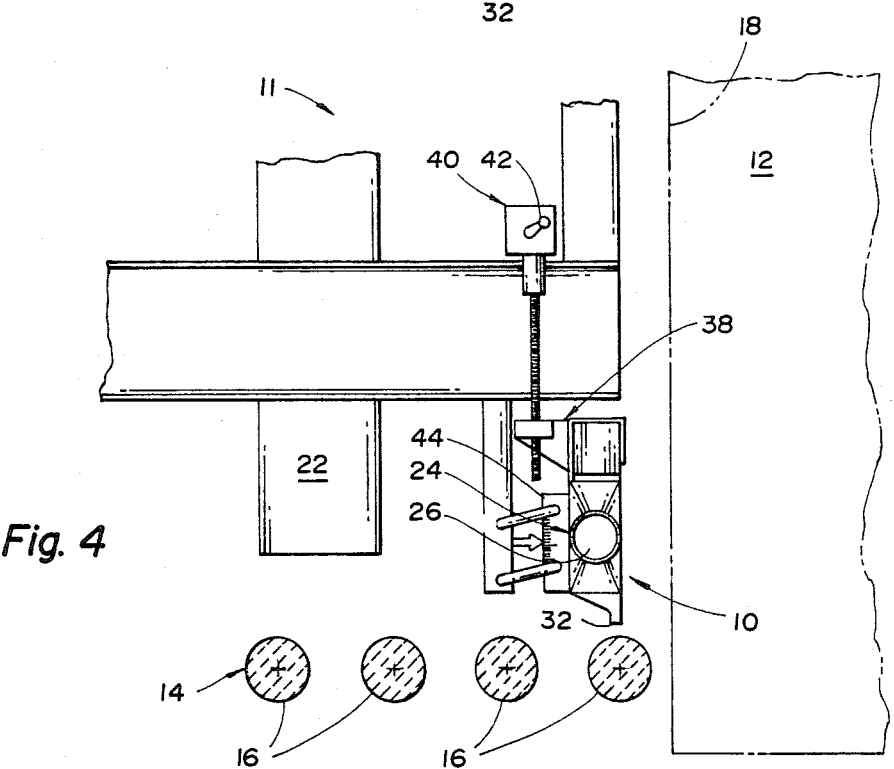
FIG. 4 is a partial side view of the arrangement shown in FIG. 1 illustrating the blow back control device mounted in the glass tempering system.

As shown in FIG. 4, adjuster 40 is a handle operated screw jack 42. The manually operated screw jack 42 type actuator eliminates using automatically operated adjusters in a location of high temperatures and relatively large temperature variations although an automatically controlled actuator can still be used. Support 38 includes an indicator 44 for indicating the elevation of the housing 24 above the conveyor rolls 16.

While the best mode for carrying out the invention has been described in detail, those familiar with the art to which this invention relates will recognize various alternative designs and embodiments for practicing the invention as defined by the following claims.

What is claimed is:

1. In a glass tempering system having a roller conveyor including rolls for receiving a sheet of glass that has been heated in a glass heating furnace, the furnace including an exit end having an exit opening through which the heated glass sheet is discharged from the furnace along the rolls, the glass tempering system also having a quenching station for applying cooling gas to the heated glass sheet, a blow back control device comprising: a housing defining a suction chamber located near the exit opening of the furnace; and suction means connected to the housing for drawing spent cooling gas through the suction chamber and for discharging the gas away from the furnace exit opening to avoid temperature swings in the furnace caused by cooling gas entering the furnace.

2. A blow back control device as in claim 1 wherein the suction means comprises a blower.

3. A blow back control device as in claim 2 wherein the blower comprises a centrifugal blower.

4. A blow back control device as in claim 1 wherein the housing is positioned above the exit opening of the furnace.

5. A blow back control device as in claim 1 wherein the housing has a slot that opens into the suction chamber and through which the cooling gas is drawn, the slot extending along the suction chamber in a direction perpendicular to the glass sheet movement on the roller conveyor.

6. A blow back control device as in claim 5 wherein the slot in the housing is positioned over the conveyor roll at the quenching station nearest the exit end of the furnace.

7. A blow back control device as in claim 1 wherein the housing has housing portions defining a plurality of suction chambers and slot portions.

8. A blow back control device as in claim 7 wherein each suction chamber includes a suction means.

9. A blow back control device as in claim 8 wherein the housing has a pair of housing portions defining a pair of suction chambers mounted adjacent to each other with the respective suction means opposed to each other; the housing portions are positioned with each slot portion extending from the center of the roller conveyor at the quenching station conveyor roll nearest the exit end of the furnace so that the two slot portions extend at least the full length of the exit opening.

10. A blow back control device as in claim 1 further including a support on the housing for mounting the housing in the glass tempering system.

11. A blow back control device as in claim 10 wherein the support includes an adjuster for adjusting the vertical positioning of the suction chamber housing above the conveyor rolls.

12. A blow back control device as in claim 11 wherein the adjuster includes a manually operated actuator for raising and lowering the suction chamber housing.

13. A blow back control device as in claim 12 wherein the manually operated actuator comprises a handle operated screw jack.

14. A blow back control device as in claim 11 wherein the support includes an indicator for indicating the elevation of the suction chamber housing.

15. In a glass tempering system having a roller conveyor including rolls for receiving a sheet of glass that has been heated in a glass heating furnace, the furnace including an exit end having an exit opening through which the heated glass sheet is discharge from the furnace along the rolls, the glass tempering system also having a quenching station for applying cooling gas to the heated glass sheet, a blow back control device comprising: a housing defining a suction chamber; a support on the housing for mounting the suction chamber housing above the exit opening of the furnace; the housing having a slot extending therealong and opening into the suction chamber; and a blower connected to the housing for drawing spent cooling gas into the suction chamber through the slot and for discharging the gas away from the exit opening of the furance to avoid temperature swings in the furnace caused by cooling gas entering the furnace.

16. In a glass tempering system having a roller conveyor including rolls for receiving a sheet of glass that has been heated in a glass heating furnace, the furnace including an exit end having an exit opening through which the heated glass sheet is discharge from the furnace along the rolls, the glass tempering system also having a quenching station for applying cooling gas to the heated glass sheet, a blow back control device comprising: a housing having a pair of housing portions defining a pair of suction chambers mounted adjacent each other, the housing having a slot including a pair of slot portions extending along each suction chamber and opening thereinto; a support for mounting the housing above the exit opening of the furnace with each slot portion positioned over the conveyor roll at the quench station nearest the exit end of the furnace; a manually operated adjuster for adjusting the vertical position of the housing and the suction chambers defined thereby with respect to the adjacent conveyor roll; and two centrifugal blowers respectively connected to the pair of suction chamber to draw spent cooling gas into the suction chambers through the slot portions thereof and for discharging the gas away from the exit opening of the furnace to avoid temperature swings in the furnace caused by cooling gas entering the furnace.

* * * * *